under 35 U.S.C. 154(b) by 611 days.

(12) United States Patent
Farrer et al.

(10) Patent No.: US 9,224,245 B2
(45) Date of Patent: Dec. 29, 2015

(54) MESH ANIMATION

(75) Inventors: Luke Leslie Farrer, Brookline, MA (US); Dale Owen Royer, Somerville, MA (US)

(73) Assignee: Hangzhou Conformal & Digital Technology Limited Corporation, Zhejiang Providence (CN)

( * ) Notice: Subject to any disclaimer, the term of this patent is extended or adjusted under 35 U.S.C. 154(b) by 611 days.

(21) Appl. No.: 12/987,363

(22) Filed: Jan. 10, 2011

(65) Prior Publication Data

US 2012/0176379 A1     Jul. 12, 2012

(51) Int. Cl.
*G06T 17/20* (2006.01)
*G06T 13/40* (2011.01)

(52) U.S. Cl.
CPC ............... *G06T 17/205* (2013.01); *G06T 13/40* (2013.01)

(58) Field of Classification Search
CPC .......... H04N 2213/003; G06T 7/0051; G06T 2207/10028; G06K 2209/40
USPC ........................................................ 345/420
See application file for complete search history.

(56) References Cited

U.S. PATENT DOCUMENTS

| | | | |
|---|---|---|---|
| 7,127,081 B1 * | 10/2006 | Erdem | 382/103 |
| 2003/0001862 A1 | 1/2003 | Chu et al. | |
| 2008/0170777 A1 * | 7/2008 | Sullivan et al. | 382/154 |
| 2009/0177454 A1 * | 7/2009 | Bronstein et al. | 703/11 |
| 2009/0195544 A1 | 8/2009 | Wrinch | |
| 2009/0238449 A1 | 9/2009 | Zhang et al. | |
| 2009/0296984 A1 * | 12/2009 | Nijim et al. | 382/103 |
| 2010/0119109 A1 | 5/2010 | Kim et al. | |
| 2010/0207938 A1 | 8/2010 | Yau et al. | |
| 2010/0283785 A1 * | 11/2010 | Satulovsky | 345/440 |
| 2011/0164141 A1 * | 7/2011 | Tico et al. | 348/207.99 |
| 2011/0175994 A1 * | 7/2011 | Genovesio et al. | 348/79 |

OTHER PUBLICATIONS

Carlo Tomasi, et al. "Detection and Tracking of Point Features" *Shape and Motion from Image Streams: a Factorization Method— Part 3*. pp. 1-20 (Apr. 1991).

* cited by examiner

*Primary Examiner* — Haixia Du
(74) *Attorney, Agent, or Firm* — Occhiuti & Rohlicek LLP

(57) ABSTRACT

In one aspect, in general, parallel image and depth maps are acquired of a subject using a three-dimensional camera on a common and dense set of pixel locations. A two-dimensional mesh animation is determined based on motion tracking in the acquired images. The two-dimensional mesh animation is then combined with the depth maps for form three-dimensional mesh animation suitable for rendering.

18 Claims, 2 Drawing Sheets

MESH ANIMATION

BACKGROUND

This invention relates to animation of a mesh, for instance, according to image tracking Modern three-dimensional (3-D) computer animation systems typically use simplified representations of the anatomy of animated characters. For example, a mesh of points may be used to represent the topography of a character's face. To facilitate the animation process, a "rig" is often created by defining a number of animation variables that control the location of one or more of the points on the mesh. To animate the character, the animation variables are adjusted over time.

For example, to animate a scene of a character speaking, an animator may adjust one or more animation variables to impart motion to, for example, the character's lips. In some examples, the animator needs to adjust the animation variables for each frame of a scene. With typical frame rates ranging from 24 to 30 frames per second, creating a scene that lasts just a few seconds can be a time consuming and arduous task.

In some other examples, the amount of animation effort can be reduced by software that allows animators to specify a desired destination animation variable value and then interpolating the animation variable values for a number of frames until the desired destination variable value is met.

In addition to the amount of time necessary to animate a scene, animators face the challenge of animating humans in a photorealistic manner. Up to this point, the complexity of human biomechanics has made photorealistic animation of humans an almost intractable challenge.

There is a need for a system that can accurately and quickly create animations of human movements.

SUMMARY

In one aspect, in general, parallel image and depth maps are acquired of a subject using a three-dimensional camera on a common and dense set of pixel locations. A two-dimensional mesh animation is determined based on motion tracking in the acquired images. The two-dimensional mesh animation is then combined with the depth maps to form three-dimensional mesh animation suitable for rendering.

In another aspect, in general, an animation method includes accepting a series of frames of a subject, each frames comprising a depth map and an image at substantially equivalent resolutions. Each location in an image corresponds to a location in the depth map. A plurality of features in the images of the frames are selected and tracked. The tracking produces, for each of the plurality of features, a series of locations of the feature in the series of images. The selecting and tracking requires as input a series of processed forms of the images that characterize a curvature of an intensity represented in the images. The method further includes aligning a mesh representation to a first of the images. The mesh representation comprises a plurality of mesh points and the aligning of the mesh representation including determining locations in the first of the images of the mesh points. A relationship between the locations of the features and the locations of the mesh points in the first of the images is formed, and alignment of the mesh representation with each of the series of images is determined using the locations of the tracked features and the relations between the locations of the features and the locations of the mesh points.

Aspects can include one or more of the following features.

A three-dimensional alignment of the mesh representation is determined for each frame by combining the alignment of the mesh representation to the image with the depth map corresponding to said image.

Determining the three-dimensional alignment of the mesh includes, for each point of the mesh, using two-dimensional coordinates of the point in the alignment of the mesh with the image to select a location in the depth map to determine the depth coordinate of the location of the mesh point.

For at least some locations of the mesh points, determining the depth coordinate of the location of the mesh point includes interpolating depth values in the depth map.

An animation is rendered based on the determined three-dimensional alignment of the mesh at sequential frames.

The depth map and the image of each accepted frame is represented on a same set of coordinate locations.

The set of coordinate locations includes at least 250000 coordinate locations on a rectangular lattice.

The selecting and tracking includes determining for each frame a curvature map from the image of the frame.

The determining of the curvature map comprises determining a smoothed 3-D image and then determining a curvature map from the smoothed 3-D image.

Determining the smoothed 3-D image includes applying a surface smoothing approach to a surface formed according to an intensity of the image.

Applying the surface smoothing approach comprises applying a Gaussian weighted surface smoothing approach.

Determining a curvature map from a 3-D image includes determining a Gaussian curvature at points in the image.

The selecting and tracking based on a series of processed forms of the images includes applying a Kanade-Lucas-Tomasi (KLT) feature tracker to the processed forms of the images.

Forming the relationship between the locations of the features and the locations of the mesh points includes determining Barycentric coordinates characterizing the relationship.

The method further includes determining locations of a physical part of the subject in one of the images, and relating the determined locations to locations of tracked features in the image.

The locations of the physical part in other of the images are determined according to the locations of the tracked features and the relationship of the determined locations to the tracked features.

The physical part of the subject includes at least one of an eye and a mouth of the subject.

Rendering the subject according to the determined locations of the physical part.

Accepting the series of frame of a subject includes acquiring said frames using three-dimensional camera.

Advantages of the aspects can include one or more of the following.

A highly accurate animated mesh can be obtained with relatively little operator effort and machine computation based on the correlated image and depth maps.

The high density of the depth map allows transforming two-dimensional alignments of the mesh to images to form three-dimensional alignments of the mesh.

Other features and advantages of the invention are apparent from the following description, and from the claims.

DESCRIPTION

1 System Overview

Figure 1:
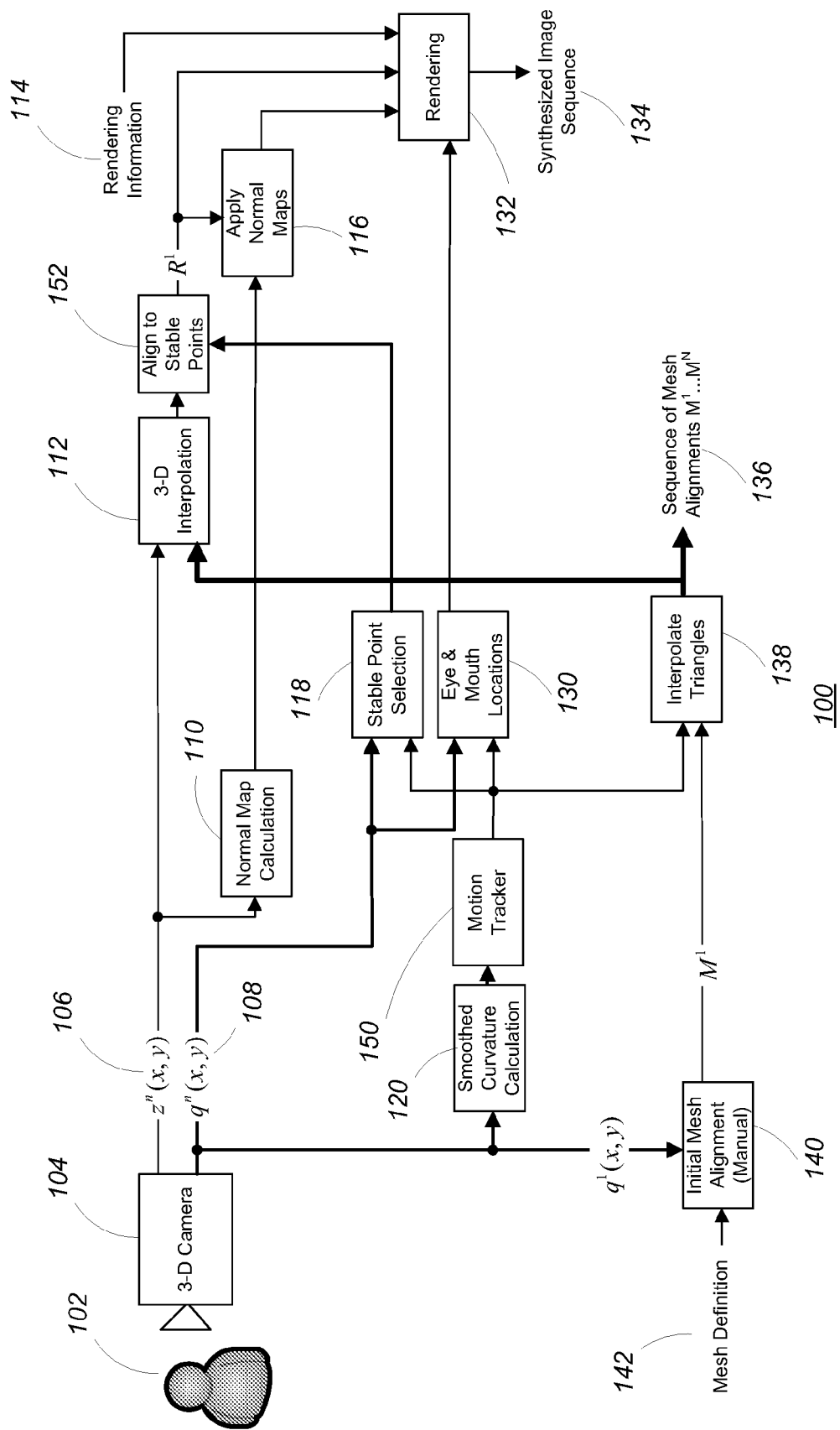
FIG. 1 is a block diagram of an animation system configured to render a synthesized image sequence from acquired 2-D and 3-D video data.

Embodiments of an animation system 100 used for creating an animating mesh for computer animation are described below. Generally, these embodiments share an overall approach that is illustrated in FIG. 1. In some examples, the animated mesh can be used to impart the recorded facial movements and expressions of a human subject onto a prototypical mask of a human face to render an animated image sequence. In some examples, the animated mesh may be used directly or with modifications (e.g., according to an associated rig) to impart facial movements and expressions to a non-human mask (e.g., a mask of an animal or a monster).

An overview of the system 100 is provided below with reference to FIG. 1, and more detail description of elements of the system is provided in subsequent sections. Generally, the system begins with an acquisition of a sequence of image frames of a subject 102 using a 3-D camera 104. The output of this camera comprises a series of frames (indexed by n=1, 2, ..., N), for example, at 24 or 30 frames per second, that provide both an image (e.g., a gray scale intensity image) and corresponding three dimensional information. In this embodiment, the information output from each frame comprises $(q''(x, y), z''(x, y))$, where $q''$ is an intensity map and $z''$ is a corresponding depth map. Both the intensity and the depth are dense, for instance, including 250,000 (x, y) points per frame. An output of the system 100 is a series of 2-D mesh alignments $M''$, as well as corresponding 3-D mesh alignments $R''$. In this embodiment, various sizes and/or topologies (shapes) of mesh can be used, for example, the mesh may include approximately 2,500 points, which is two orders of magnitude smaller than the number of points in the originally acquired images. A mesh alignment includes, for each point in the mesh, either a 2-D (for $M''$) or 3-D (for $R''$) coordinates of each of the points in the reference frame of the originally acquired frames (or optionally in a motion stabilized reference frame). These mesh alignments may then be used, for example, for rendering animated image sequences.

Generally, the system applies an initial mesh with an alignment $M^1$ to at least one image, for instance the first image $q^1$, and then based on tracking movement in the sequence of images $q''$ the system then creates an animated mesh based on a consistent mesh definition determined as the sequence of 2-D mesh alignments $M''$. Generally, movement of a particular mesh point throughout the series of frames corresponds to movement of a corresponding point on the skin of the subject.

The process of determining the sequence of mesh alignments $M''$ is based on tracking a set of (x, y) points over time from frame to frame. Very generally, this tracking of points is based on an optical flow approach. However, rather than making use of the intensity maps $q''$ directly, these intensity maps are pre-processed to determine curvature maps that provide improved tracking characteristics over time and thereby provides a higher quality sequence of mesh alignments. An interpolation approach is then used to convert the trajectories of tracked points to trajectories of mesh point coordinates. Various additional operations are used, for instance, to handle tracking of the top eyelids, the inner lip, and other features that may benefit from specialized processing to yield high-quality animated meshes.

The 2-D coordinates of the mesh coordinates are combined with the depth map acquired with the camera to form the sequence of 3-D mesh alignments, $R''$, for instance, based on an interpolation of the depth map $z''(x, y)$. Therefore, this sequence of 3-D mesh alignments represents a compression of the original data providing locations of a consistent set of points in each frame of the sequence.

In some examples, the animated 3-D mesh is combined with the prototypical mask to render a synthesized image sequence where the facial movements of the subject are imparted to the prototypical mask in a photorealistic manner.

Other optional steps are used in particular embodiments. For example, the optical tracking may involve various forms of constraint so that mesh points remain associated with physical locations on the subject. In some examples, the output is motion stabilized to remove effects of the subject moving during the initial image acquisition. In some examples, various techniques are applied to eye and mouth areas in order to address particular issues associated with those areas.

A number of the steps and procedures introduced above are discussed in detail in the following sections.

2 Image Capture

The operation of the animation system 100 begins with the acquisition of a series of images of a subject 102. In some examples, the images are acquired by a 3-D camera 104.

As is described above, the output of the 3-D camera 104 comprises a series of frames (indexed by n=1, 2, ..., N), for example, at 24 or 30 frames per second. The resulting frames can include a sequence of 2-D intensity images $q''(x, y)$ 108 (e.g., a gray scale intensity image) and a sequence of depth maps $z''(x, y)$ 106 that provide 3-D information. The intensity and depth information are registered with one another by being represented in the same coordinate system and at the same resolution. Both the intensity and the depth images are dense, for instance, including approximately 250,000 (x, y) points (e.g., approximately 640×480 pixels) per frame.

In some examples, alternative image capture devices or systems may be used instead of the 3-D camera 104. Preferably, the alternative image capture approach outputs a sequence of 2-D intensity images 108 and a sequence of 3-D depth information sufficiently dense (e.g., include significantly more (x, y) points than the desired animated 3-D mesh).

In some examples, the skin of the subject 102 may be treated with a contrast enhancing agent such as talcum powder. The improved contrast provided by such a treatment may improve the performance of later modules in the animation system, in particular, the optical flow tracking module 150. However, in practice, use of such agents does not appear to be necessary for operation of the system.

An example of a camera 104 used in the system is the GeoVideo camera from Geometric Informatics of Somerville, Mass., USA.

3 Optical Flow Tracking

Figure 2:
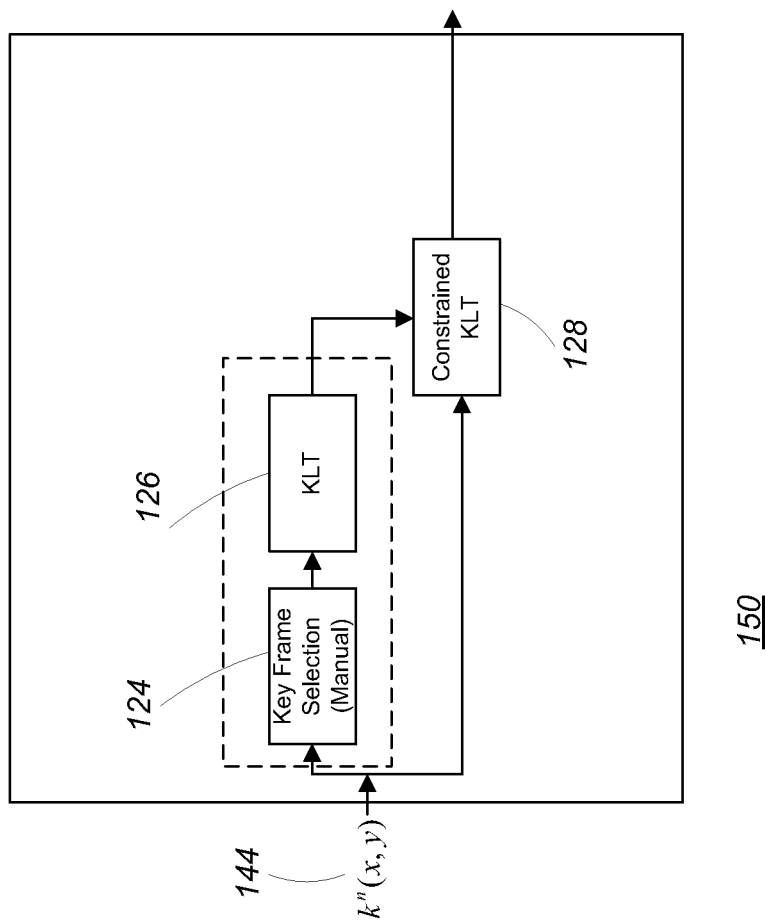
FIG. 2 is a block diagram of a motion tracker used in the animation system of FIG. 1.

Referring to FIG. 2, two aspects of the optical flow tracking 150 relate to the features that are input to the tracking procedure, and approaches to testing for or guaranteeing that points are consistent as they are tracked through the sequence of frames.

3.1 Smoothed Curvature Calculation

Continuing to refer to FIG. 1, the sequence of 2-D intensity images 108 is first processed by a smoothed curvature calculation module 120 to prepare the images for use by the motion tracking module 150. In some examples, the processing in the smoothed curvature calculation module 120 converts the sequence of 2-D intensity maps $q''(x, y)$ 108 to a form that can be used by the motion tracker by applying Gaussian smoothing and calculating Gaussian curvature at each point.

In some examples, the smoothing is preformed on a frame by frame basis to transform the intensity map $q''(x, y)$, which is defined on a lattice of points $(x, y)$, to a smoothed intensity map $\tilde{q}''(x, y)$. One approach to performing this smoothing is to consider the intensity to represent a height so $q''(x, y)$ defines an intensity surface in a three-dimensional space (two spatial dimensions and one intensity dimension). Then, this 3-D surface is smoothed in order to form corresponding points on a smoothed surface. For example, as part of the smoothing, coordinates of each three-dimensional point $(x_j, y_j, q_j)$, where $q_j = q''(x_1, y_j)$, are mapped to a three dimensional point $(\tilde{x}_j, \tilde{y}_j, \tilde{q}_j)$. These mapped points together define the smoothed function $\tilde{q}''(x, y)$. In some examples, this smoothing operation makes use of a Gaussian kernel such that each three-dimensional point is mapped to a Gaussian weighted average of nearby other points on the intensity surface.

The smoothed curvature calculation module 120 then determines a curvature $k(x, y)$ from the smoothed function $\tilde{q}(x, y)$. In some example, this curvature $k(\tilde{x}_j, \tilde{y}_j)$ is computed as the Gaussian Curvature at the surface at the point $(\tilde{x}_j, \tilde{y}_j, \tilde{q}_j)$ as computed in the smoothing step. The curvature map $k''(x, y)$ is then defined in this manner for all the original coordinates of the image $q''(x, y)$ for each frame n. In certain user interfaces, both the intensity $q(x, y)$ and its associated curvature $k(x, y)$ may be presented side-by-side.

3.2 Image Flow Trajectories

The sequence of curvature maps $k''(x, y)$ is then used as the input to the motion tracking module 150. In some embodiments the motion tracker is based on a Kanade-Lucas-Tomasi (KLT) feature tracker. Generally, the tracker selects points in a first frame that are suitable for tracking, for example based on the local variation of the input in the vicinity of each pixel. A subset of the pixels are selected as the locations of "features" that are then tracked from frame to frame. The tracker provides for a way to map such selected features from one frame to another. In the case of the KLT algorithm, the mapping of a feature from one frame to the next is based on locating a possibly transformed (e.g., rotated, scaled, translated) version of the feature in one frame in the vicinity of the previous location of that feature (i.e., allowing a limited amount of translation from frame to frame, optionally accounting for overall image translation and/or rotation). In some cases, a feature is not found in the subsequent frame, for example, because the feature is occluded or has moved farther than the limit allowed by the algorithm.

By repeating this mapping procedure from frame to frame in a sequence of frames, certain points will be part of a continuous trajectory with a corresponding location in each frame. Some trajectories may be present only over a sub-interval of the sequence of frames. Generally, the approaches described below make use of only feature trajectories that span an entire sequence of input frames.

The result of this process is a set of feature points $P = \{p_1, p_2, \ldots, p_K\}$, each of which has a consistent trajectory of coordinate locations $(x_k^1, y_k^1), (x_k^2, y_k^2), \ldots (x_k^N, y_k^N)$ in the entire sequence of input frames. Such trajectories form the basis for the mesh animation described below.

A property of the KLT approach is that a point along a trajectory may "slide" in that its association with a physical point on the subject may change over time, rather than remaining consistent. Such "sliding" can result from tracking points over a large number of frames, causing small tracking errors to accumulate over time. Approaches described below, for example, related to the user of "key frames" and the use of tracking in both positive and negative time directions, are used to mitigate this effect.

Another property of the KLT approach is that certain areas of a subject may be inherently affected by trajectories that are not continuous. For example, points on a subject's eye, such as the eyeball, may be present only when the eye is open, and therefore lack continuity in the output of the tracking algorithm. Such a lack of continuity can cause the points in certain areas to be lost, resulting in their exclusion from the output of the tracking algorithm.

3.3 Key Frames

Referring to FIG. 2, in some examples, the problem of point "sliding" is alleviated by using a key frame selection module 124 through which a user selects a series of "key frames" before processing the entire sequence of frames using the KLT algorithm.

The key frame selection module 124 allows the animation system's user to designate certain images in the sequence as "key frames." In some examples, suitable key frames can be identified by finding images where the subject is in a neutral position, for example, in the case of an animation of a subject's face, with an expression with a closed mouth. Ideally, the images should look as similar as possible. For example, for a 2 minute (3600 frame) sequence, key frames may be spaced 200-400 frames apart (e.g., every approximately 10 seconds). As more key frames are added, the quality of the KLT algorithm result generally improves. In some examples, the algorithm result can be further improved by aligning the designated key frames with each other.

A first motion tracker 126 is applied to the subsequence of key frames to identify features ("keyframe features") that exist in both the first key frame and each subsequent key frame. For example, the first motion tracker 126 may separately identify point trajectories between key frames 1 and 200, 1 and 400, 1 and 600, etc. Since the motion tracker 126 only identifies point trajectories between two key frames at a time, "sliding" is eliminated. Further improvements in the stability of the points identified by the motion tracker 126 are provided by factors including the shorter length of the subsequence of frames, and the relative similarity of the selected key frames.

In some examples, the selection of key frames is aided in an interactive process with the user in which the user can view the sequence of selected features to confirm their "stability" from frame to frame, and optionally remove or add key frames until a desirable set of features are selected by the motion tracker 126. In some examples, the stability of such frames is viewed on a graphical interface by showing feature locations as colored spots, thereby allowing the user to assess the stability of the features through the sequence of key frames.

The key frames effectively break the entire sequence of input frames into time sections. These sections are then processed using a constrained motion tracker 128, which generally attempts to provide trajectories for the features between the key frames. In some examples, the constrained motion tracker again uses a KLT approach with the curvature maps as input. To the extent that a full trajectory is found for a feature between each of the key frames, that feature exhibits both stability and continuity through the entire frame sequence.

In some examples, the keyframe features are first tracked forwards from a first key frame to a second key frame and are then tracked backwards from the second key frame to the first key frame. Because the forward and backward tracking of a feature does not in general yield identical locations, in some examples, the forward and backward tracking results are interpolated, yielding a more accurate tracking result and eliminating slight noticeable jolts that may occur between key frame sections.

The constrained motion tracker 128 utilizes a search window that has its size specified as a number of pixels. There is a tradeoff in choosing a search window size. Smaller search window sizes yield better quality tracking results but are less robust to rapid changes in the sequence of smoothed curvature 2-D images 144. Conversely, larger search window sizes yield poorer quality tracking results but are more robust to rapid changes in the sequence of smoothed curvature 2-D images 144.

In some examples, the system 100 deals with this tradeoff by performing the tracking process a number of times, using different window sizes. First, the tracking process is performed using a small search window (e.g., 21 pixels), yielding high quality tracking results. However, this small window size can cause poor quality tracking results (i.e., relatively more tracking points are lost) in the presence of sudden movements such as the mouth opening.

Subsequent runs of the tracking process are then performed using higher window sizes (e.g., 31,41,51,61 pixels). The quality of the tracking degrades as the window size increases but more rapid movements can be detected without losing points. For example, the higher window sizes can be especially useful for tracking lip movement. The results of all runs of the tracking process can be combined to yield a complete set of tracked points for the entire sequence frames.

In some examples, if the forward and backward tracking of a keyframe feature are not continuous, small discontinuities may be "bridged" in order to determine a continuous trajectory.

4 Mesh Alignment

The set of tracked features determined by the motion tracker, optionally using the key frame approach described above, forms the basis for determining the motion of the animation mesh.

Referring again to FIG. 1, a mesh definition 142 (e.g., a topology specifying the interconnection of mesh points to form regions of the mesh) is passed to the initial manual mesh alignment module 140. The user selected a frame, typically the first frame of the input frame sequence. Generally, this module uses a graphical presentation to a user, who aligns at least some points of the mesh to the image (e.g., to the intensity map $q^1(x, y)$) of the selected first frame in the sequence. The result of this alignment is $M^1$ which comprises a set of locations of the mesh points in the first image.

A mesh interpolation module 138 relates the locations of the mesh points in the first image to the locations for the tracked features in the first frame. In some examples, this relationship is based on forming Barycentric coordinates of each of the feature locations based on locations of a corresponding subset of mesh points (e.g., a minimal set of mesh points that form a triangle surrounding the feature) or mesh locations based on locations of subsets of the features.

Mesh alignments $M^n$ in subsequent frames are then determined by the mesh interpolation module 138 by using the relationship between feature locations and mesh point locations (e.g., the Barycentric coordinates).

In some examples, the user is provided with a graphical view of the mesh alignments, thereby allowing the user to edit the alignment upon which the sequence is based. This graphical view can be used by the user for the purpose of evaluating how successfully points around problem areas (e.g., the mouth) were tracked by comparing the image with the final mesh alignment of the sequence of mesh alignments 136.

The 2-D representation of the topology of the sequence of mesh alignments can then be viewed overlaid on the corresponding 2-D intensity image. This facilitates the identification of incorrectly tracked points. For example, if a point is incorrectly tracked, it will deform the mesh and become instantly recognizable. The user then removes the incorrectly tracked points from the mesh, causing the mesh to be recalculated.

The result of the mesh alignment is, for each frame in the sequence, and for each point in the mesh, a typically sub-pixel (i.e., fractional pixel spacing) location of the mesh point in the original frame.

A 3-D interpolation module 112 uses the sequence of mesh alignments 136 and the sequence of 3-D images 106 to create a sequence of 3-D mesh alignments. Because there is a direct correlation between the sequence of 2-D intensity maps 108 and the sequence of 3-D maps 106, each pixel in a 2-D intensity maps corresponds to a point in 3-D space in a corresponding 3-D image. The 3-D mesh interpolation module 112 exploits this correlation by mapping (point-by-point) each mesh alignment in the sequence of 2-D mesh alignments 136 to its corresponding 3-D image in the sequence of 3-D images 106. The result is a sequence of 3-D mesh alignments. Note that because, in general, the mesh alignments have sub-pixel point locations, an interpolation approach is used to determine depth values $z(x, y)$ at such sub-pixel mesh point locations $(x, y)$.

5 Align Stable Points

In some examples, it is desirable that the subject's head moves as little as possible throughout the sequence of 3-D mesh alignments. However, it is virtually impossible for a human to avoid head movement over an extended period of time. Therefore, the animation system 100 includes a stable point selection module 152, which allows the user to select points that are used "stable points" to remove head movement. The stable point alignment module 152 then aligns the stable points in each mesh alignment of the sequence of 3-D mesh alignments to the stable points identified in the first 3-D mesh alignment, thereby removing all head movement.

6 Rendering

In some embodiments, the 3-D mesh alignments $R''$ are passed to a rendering module 132. In some examples, the rendering module uses a prototypical mask (e.g., a high quality color photograph) including color textures which is supplied to the system through the rendering information 114. The color is mapped into the first frame's domain using a procedure very similar to mapping the topology points into the first frame (i.e., Barycentric triangulation).

The resulting synthesized image sequence 134 is a sequence of 3-D images including the recorded facial expressions of the subject 102 imparted to the prototypical mask provided in the rendering information 114.

7 Additional Steps

In some embodiments, additional steps may be performed to improve the quality of the synthesized image sequence 134. For example, the user may specify eye, mouth, and chin locations, select stable points, add new points, or apply normal maps.

7.1 Eye, Mouth, and Chin Locations

Certain facial features can be difficult or impossible for the KLT algorithms 126, 128 to track. For example, the eyes and mouth move quickly and points sometimes disappear from frame to frame (e.g., an eyelid). Thus, the animation system 100 uses an eye and mouth location module 130 to enable the user to manually identify such tracking points. Generally, the system provides a way to determine a contour of the eye socket, and of the mouth, thereby allowing the rendering procedure to use special rendering techniques for those areas.

In some examples, because tracked feature points are not necessarily found along the boundary of the eye or the mouth, additional points are identified by the user though a graphical interface to define the desired eye and mouth contours. The locations of these additional points are then defined based on locations of the tracked points, for example, as interpolations and/or offsets from those tracked feature points. In this way, the additional points can be tracked from frame to frame based on the locations of the tracking points upon which they depend.

The eye is tracked using eye guide track points, the top eyelid position, and the entire open eye shape. The eye guide track points are reliable tracking points in the area under the eye. They are used to gauge the bottom eyelid positions for each frame (leftmost point, rightmost point, and bottom point).

The top eyelids are then determined by identifying the whites of the subject's eyes using edge detection techniques that accentuate areas of high contrast. The boundaries of the whites of the eyes correspond to the top eyelids.

In some examples, frames including eye blinks are identified and handled as a special case. For instance, the texture of the 2-D intensity images is further processed. This processing is performed in the same way as the height map technique above, except with more smoothing applied to the mesh.

If the subject speaks during the recording of the sequence of 2-D intensity images, significant mouth movement will occur. The fast and complex mouth movement is difficult for the KLT algorithms 126, 128 to successfully track.

The eye and mouth location module 130 enables the user to identify important tracking points on the mouth that were likely lost (e.g., the inner lip) in the tracking process.

The inner lip is tracked by positioning an extra set of track points moving inwards to the mouth center. A curve can be drawn from each mouth corner point through the inner set of lip points, and extra track points can be created along this curve. The track points along the inner lip curve provide a robust set of tracking points that transfer lip movement from the outer lip area into the inner lip area. These points work on the assumption that all lip movement is essentially the same.

First, the top lip stable points are identified. The user identifies a frame with a suitable amount of top lip visible. The user then selects a set of outer top lip track points (at least 1 point) and a set of inner top lip points (at least 1 point)

Next, the bottom lip stable points are identified. The user identifies a frame with a suitable amount of bottom lip visible. The user then selects a set of outer bottom lip track points (at least 1 point) and a set of inner bottom lip points (at least 1 point).

Next, the left and right mouth corner points are identified. In this case, the user may select a single track point that is exactly on the mouth corner. If no single track point is exactly on the mouth corner then the user may select two points that the mouth corner is between.

Next, the user selects eye guide points that identify the bottom part of the eye or eyelid. The eye guide points are a set of tracking points surrounding the lower part of the eye that are selected by the user. They are used to track the left, right, and lower central part of each eye. It is important to choose eye guide points such that they are stable throughout the whole sequence of 2-D intensity images 108.

Another area of the face where tracking may be difficult is the area below the bottom lip. The area between the bottom lip and the chin moves frequently during speech, and requires additional attention from the animation system 100. In some examples, the animation system 100 performs a series of tracking runs that are dedicated to dealing with points that are present below the bottom lip.

For example, a search window with a large size (e.g., 61 pixels) can be used to gauge the approximate location of the corners of the mouth and the bottom lip. A curve is then drawn through these points. The curve can be considered as a straight line and the trackable data can be resampled in this domain to remove the most excessive motion such that the area below the bottom lip can be tracked more accurately using a smaller window size (e.g., 21 pixels).

During rendering, model eyes can then be moved into position by analyzing the eye track data for the first frame. Once they are in position, the eyeballs can be moved back until they virtually no longer intersect the face geometry. The eye boundary geometry can then be attracted to the eyeballs. Smoothing may be performed around the eye boundary area to improve appearance.

The mouth bag model can then be moved into place by observing the average 3-D location of the mouth corner tracking points. The model is moved back joined to the lip boundary to create a single piece of geometry.

7.2 Normal Maps

In some examples, normal maps are calculated from the sequence of 3-D images $z''$ 106 and applied to the sequence of 3-D mesh alignments by a normal map application module 116.

In particular, normal maps allow for the simulation of highly detailed geometry without the use of additional points in the 3-D mesh alignments. For example, the shading of a particular region of the 3-D mesh can be calculated by the rendering module 132 based on the output of the normal map calculation module 110. This is possible because normal map calculation module 110 receives a high resolution sequence of 3-D images 106.

8 Implementation and Alternatives

Implementations of the approaches described above may include software, which includes instructions stored on a tangible machine readable medium for causing a data processing system to perform the procedures described above. In some implementations, a number of different processors are used together to perform the tasks in a parallel or distributed fashion. In some implementations, some of the tasks are performed using special purpose hardware, or programmable special purpose processors.

It should be understood that other processing approaches for the image information may be used. For example, other forms of "curvature" calculation may be used. Furthermore, the processing of the images may be integrated into the motion tracking steps, thereby not necessitating the explicit computation of the transformed images while nevertheless gaining the benefit of the transformation approach. Finally, the KLT motion tracking approach is only one example of an image-based tracking procedure. Other tracking approaches may be substituted.

In some embodiments, the result of the 3-D mesh alignment is not used directly for animation, and further processing is performed. For example, in some examples, an animator may associate a "rig" with the mesh, and the 3-D alignment is used to further allow manipulation of animation variables by the animator, for example, to modify the acquired motion prior to rendering.

It should also be understood that the particular input approach using the aligned image and depth maps are not necessary. Other approaches in which the 2-D coordinates of the interpolated mesh can be mapped into a 3-D space can be used, as long as there is sufficient resolution in the depth information to provide high-accuracy mapping into the 3-D space.

It is to be understood that the foregoing description is intended to illustrate and not to limit the scope of the inven-

What is claimed is:

1. An animation method comprising:
accepting a series of frames of a subject, each frame comprising
a depth map including a first plurality of points, each point of the first plurality of points corresponding to a location in the depth map, and
a two-dimensional image including a second plurality of points having a number of points substantially equivalent to a number of points in the first plurality of points, each point of the second plurality of points corresponding to a location in the two-dimensional image,
wherein each location in the two-dimensional image corresponds to a location in the depth map;
selecting and tracking a plurality of features in the two-dimensional images of the frames, the tracking producing for each of the plurality of features a series of locations of the feature in the series of two-dimensional images, wherein the selecting and tracking includes determining for each frame a curvature map from the two-dimensional image of the frame, the curvature map characterizing a curvature of intensity surfaces represented in the two-dimensional image;
receiving a predefined mesh representation, the predefined mesh representation including a plurality of mesh points;
aligning the mesh representation to a first of the two-dimensional images, including determining locations in the first of the two-dimensional images of the mesh points;
forming a relationship between the locations of the features and the locations of the mesh points in the first of the two-dimensional images; and
determining an alignment of the mesh representation with each of the series of two-dimensional images using the locations of the tracked features and the relations between the locations of the features and the locations of the mesh points.

2. The method of claim 1 further comprising:
determining a three-dimensional alignment of the mesh representation for each frame by combining the alignment of the mesh representation to the image with the depth map corresponding to said image.

3. The method of claim 2 wherein determining the three-dimensional alignment of the mesh includes, for each point of the mesh, using two-dimensional coordinates of the point in the alignment of the mesh with the image to select a location in the depth map to determine the depth coordinate of the location of the mesh point.

4. The method of claim 3 wherein for at least some locations of the mesh points determining the depth coordinate of the location of the mesh point includes interpolating depth values in the depth map.

5. The method of claim 2 further comprising:
rendering an animation based on the determined three-dimensional alignment of the mesh at sequential frames.

6. The method of claim 1 wherein the depth map and the image of each accepted frame is represented on a same set of coordinate locations.

7. The method of claim 6 wherein the set of coordinate locations includes at least 250000 coordinate locations on a rectangular lattice.

8. The method of claim 1 wherein the determining of the curvature map comprises determining a smoothed 3-D image and then determining a curvature map from the smoothed 3-D image.

9. The method of claim 8 wherein determining the smoothed 3-D image includes applying a surface smoothing approach to a surface formed according to an intensity of the image.

10. The method of claim 9 wherein applying the surface smoothing approach comprises applying a Gaussian weighted surface smoothing approach.

11. The method of claim 1 wherein determining a curvature map from an image includes determining a Gaussian curvature at points in the image.

12. The method of claim 1 wherein the selecting and tracking based on a series of processed forms of the images includes applying a Kanade-Lucas-Tomasi (KLT) feature tracker to the processed forms of the images.

13. The method of claim 1 wherein forming the relationship between the locations of the features and the locations of the mesh points includes determining Barycentric coordinates characterizing the relationship.

14. The method of claim 1 further comprising:
determining locations of a physical part of the subject in one of the images, and relating the determined locations to locations of tracked features in the image; and
determining the locations of the physical part in other of the images according to the locations of the tracked features and the relationship of the determined locations to the tracked features.

15. The method of claim 14 wherein the physical part of the subject includes at least one of an eye and a mouth of the subject.

16. The method of claim 1 wherein accepting the series of frame of a subject includes acquired said frames using three-dimensional camera.

17. The method of claim 1 wherein at least some of the locations of the mesh points in the first of the two-dimensional images are different from the locations of the features in the first of the two-dimensional images.

18. The method of claim 1 wherein each point in the first plurality of points of the depth map includes a representation of a measured depth.

* * * * *